Patented Jan. 18, 1944

2,339,358

UNITED STATES PATENT OFFICE 2,339,358

AZO DYE

George W. Seymour and Victor S. Salvin, Cumberland, Md., assignors to Celanese Corporation of America, a corporation of Delaware No Drawing. Application October 1, 1941,
Serial No. 413,124

14 Claims. (Cl. 8—50)

This invention relates to the preparation of new azo dyestuffs, and relates more particularly to the preparation of new dischargeable azo dyestuffs which may be used for dyeing organic derivative of cellulose materials.

An object of our invention is the preparation of new azo dyestuffs which may be employed for dyeing textile materials, and particularly those materials made of or containing organic derivatives of cellulose.

Another object of our invention is the preparation of azo dyestuffs which are dischargeable to a clear white color, are fast to light, resistant to acid fading, and which do not bleed from the materials dyed therewith.

Other objects of our invention will appear from the following detailed description.

Azo dyestuffs have been found to be well suited to the dyeing of many textile materials. Many of these dyestuffs, however, are not fast to light, some fade when exposed to an acid atmosphere while others can not be discharged to a pure white color. In addition, many azo dyestuffs, even in a dry state, tend to bleed off when placed in contact with white materials even for short periods of time. While some of these dyestuffs are better in some respects than in others, few, if any, are wholly acceptable and entirely free of all these undesirable characteristics.

We have now discovered that azo dyestuffs which are fast to light and acid fading, free from dry bleeding and dischargeable to pure whites may be obtained by diazotizing an amino compound of the following general formula:

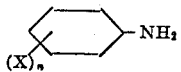

where $n$ is at least 1 and X, which may be the same or different substituents when $n$ is greater than 1, represents an $NO_2$, $SO_2CH_3$,

or halogen group, and coupling said diazotized amino compound with 1-di-hydroxyethyl-amino-3-acetanilide. By employing azo dyestuffs of this group for the dyeing of textile materials made of or containing organic derivatives of cellulose, such as cellulose acetate, it is possible to obtain these materials dyed in various shades of yellow, orange and red, depending upon the components coupled. All of the colors obtained are extremely fast to light and acid, are dischargeable, and will not dry bleed on to white fabrics.

The substituted amino compounds which may be used in accordance with our invention are amines such as, for example, o-amino-phenyl-methyl-sulfone, p-amino-phenyl-methyl-sulfone, p-amino-acetophenone, p-chlor-aniline, 2,6-dichlor-4-nitro-aniline, m-nitro-aniline and other substituted amino compounds.

The dyes may be formed in substance and the material may be dyed directly in a bath containing the desired amount of dyestuff dispersed therein by means of a suitable detergent or dispersing agent, or else the material which is to be dyed may be based with the amino compound and the coupling carried out on the material itself. The amino compound may be applied to the material in the form of dispersions, or by bath or mechanical impregnation methods, such as padding or printing. After the amino compound has been applied to the material, it may be diazotized in the usual manner using sodium nitrite and sulphuric or hydrochloric acid. It is preferable that the diazotization be carried out at a low temperature, preferably below 20° C. The diazotization may be carried out on a winch or jig or in any other suitable device for working the material. The coupling reaction may then be carried out by entering the treated material in a bath containing the coupling component. The material may be entered into a cold coupling bath which may then be heated, or the material may be entered into a bath already heated to about the desired coupling temperature. When the coupling is completed the dyed material is scoured, rinsed and dried.

The azo dyestuffs of our invention may be used for the dyeing of various naturally occurring textile materials such as silk and wool as well as textile materials comprising synthetic linear polyamide condensation products, such as nylon, but they are especially suitable for dyeing textile materials made of or containing organic derivatives of cellulose such as cellulose esters and cellulose ethers. Examples of cellulose esters are cellulose acetate, cellulose propionate, cellulose butyrate, and mixed esters such as cellulose acetate-propionate and cellulose acetate-butyrate, while examples of cellulose ethers are ethyl cellulose and benzyl cellulose.

When the dyestuffs are produced in substance they may also be employed for coloring solutions of cellulose derivatives, especially lacquers and spinning solutions. By shaping and setting such solutions in the form of filaments, straws, films and the like, valuable colored products can be obtained. For example, colored organic derivative of cellulose filaments may be produced by dry spinning such colored solutions.

In order further to illustrate our invention but without being limited thereto the following examples are given:

Example I 21 parts of 2,6-dichlor-4-nitro-aniline are dissolved in 100 parts of concentrated sulfuric acid (sp. gr. 1.83) at 10° C. with stirring. The nitrosyl sulfuric acid is made by dissolving 7.2 parts of sodium nitrite in 75 parts of concentrated sulfuric acid at 60° C. The nitrosyl sulfuric acid is cooled to 10° C. and added to the sulfuric acid solution of 2,6-dichlor-4-nitro-aniline, also at 10° C. The mixture is stirred for one-half hour at 10 to 15° C. 125 parts of glacial acetic acid are then added and the stirring continued for 1 hour at 15° C. At this time, 3 parts of urea are added to decompose the excess nitrous acid.

To a solution of 24 parts of 1-di-hydroxyethyl-amino-3-acetanilide in 400 parts of ice and water is added directly the diazonium solution of 2,6-dichlor-4-nitro-aniline over a period of 30 minutes at 0° C. The dyestuff forms as a bluish red precipitate. A 10% solution of sodium acetate is added concurrently to accelerate coupling. The suspension is stirred for 2 hours at 0 to 5° C. and the dyestuff formed is then filtered and washed. The dyestuff dyes celluuose acetate a bluish red.

All of the parts given in the above example and in the following examples are by weight.

Example II 17.1 parts of o-amino-phenyl-methyl-sulfone are dissolved in 400 parts of ice and water containing 40 parts of concentrated hydrochloric acid (sp. gr. 1.18). 7.1 parts of sodium nitrite in 40 parts of H₂O are then added slowly over 30 minutes at 0 to 5° C. The diazonium solution is stirred for 1 hour when a test with starch iodide paper shows only a trace of nitrous acid.

The diazonium solution of o-amino-phenyl-methyl-sulfone is added in 30 minutes to a solution of 24 parts of 1-dihydroxyethyl-amino-3-acetanilide in 500 parts of ice and water. A 10% solution of sodium acetate is added concurrently. The dyestuff forms as an orange solid. The suspension is stirred for 2 hours at 0 to 5° C. and the dyestuff is isolated by filtration and washed with cold water. It dyes cellulose acetate an orange shade. When p-amino-phenyl-methyl-sulfone is employed in place of the o-isomer, the resulting dyestuff dyes cellulose acetate a somewhat redder shade of orange.

Example III 12.7 parts of p-chlor-aniline are dissolved in 400 parts of ice and water containing 40 parts of concentrated hydrochloric acid (sp. gr. 1.18). 7.1 parts of sodium nitrite dissolved in 40 parts of water are added over a period of 30 minutes at 0 to 5° C. The diazonium solution is stirred for 1 hour at 0 to 5° C. when starch iodide test paper shows only a trace of nitrous acid.

The diazonium solution of p-chlor-aniline is added in 30 minutes to a solution of 24 parts of 1-di-hydroxyethyl-amino-3-acetanilide in 600 parts of ice and water. A 10% solution of sodium acetate is added concurrently. The dyestuff forms as an orange flocculent solid. The suspension is stirred for 2 hours and the dyestuff is isolated by filtration and washed with water. It dyes cellulose acetate a golden yellow.

Example IV 13.5 parts of p-amino-acetophenone are dissolved in 400 parts of ice and water containing 40 parts of concentrated hydrochloric acid (sp. gr. 1.18). 7.1 parts of sodium nitrite are dissolved in 40 parts of water and are added over a period of 30 minutes at 0 to 5° C. The diazonium solution is stirred for 1 hour at 0 to 5° C. when starch iodide test paper shows only trace of nitrous acid.

The diazonium solution of p-amino-acetophenone is added in 30 minutes to a solution of 24 parts of 1-di-hydroxyethylamino-3-acetanilide in ice and water. A 10% solution of sodium acetate is added concurrently. The dyestuff forms as a scarlet precipitate. The suspension is stirred for 2 hours and the dyestuff is isolated by filtration and washed with cold water. It dyes cellulose acetate a reddish orange shade.

It is to be understood that the foregoing detailed description is merely given by way of example and that many variations may be made therein without departing from the spirit of our invention.

Having described our invention, what we desire to secure by Letters Patent is:

1. Process for the production of azo dyestuffs which comprises diazotizing a compound selected from the group consisting of amino-phenyl-methyl-sulphone and amino-acetophenone and coupling the same with 1-di-hydroxyethyl-amino-3-acetanilide.

2. A process for the production of an azo dyestuff, which comprises diazotizing o-amino-phenyl-methyl-sulfone and coupling said diazotized amino compound with 1-dihydroxyethyl-amino-3-acetanilide.

3. A process for the production of an azo dyestuff, which comprises diazotizing p-amino-acetophenone and coupling said diazotized amino compound with 1-dihydroxyethyl-amino-3-acetanilide.

4. A dyestuff prepared by diazotizing a compound selected from the group consisting of amino-phenyl-methyl-sulphone and amino-acetophenone and coupling the same with 1-di-hydroxyethyl-amino-3-acetanilide.

5. A dyestuff prepared by diazotizing o-amino-phenyl-methyl-sulfone and coupling said diazotized amino compound with 1-di-hydroxyethyl-amino-3-acetanilide.

6. A dyestuff prepared by diazotizing p-amino-acetophenone and coupling said diazotized amino compound with 1-di-hydroxyethyl-amino-3-acetanilide.

7. Process for the coloration of material containing an organic derivative of cellulose comprising applying thereto a dyestuff prepared by diazotizing a compound selected from the group consisting of amino-phenyl-methyl-sulphone and amino-acetophenone and coupling the same with 1-di-hydroxyethyl-amino-3-acetanilide.

8. Process for the coloration of material containing cellulose acetate comprising applying thereto a dyestuff prepared by diazotizing a compound selected from the group consisting of amino-phenyl-methyl-sulphone and amino-acetophenone and coupling the same with 1-di-hydroxyethyl-amino-3-acetanilide.

9. A process for the coloration of materials, which comprises applying to materials containing cellulose acetate a dyestuff obtained by diazotizing o-amino-phenyl-methyl-sulfone and coupling said diazotized amino compound with 1-di-hydroxyethyl-amino-3-acetanilide.

10. A process for the coloration of materials, which comprises applying to materials containing cellulose acetate a dyestuff obtained by diazotizing p-amino-acetophenone and coupling said diazotized amino compound with 1-di-hydroxy-ethyl-amino-3-acetanilide.

11. Organic derivative of cellulose material colored with a dyestuff prepared by diazotizing a compound selected from the group consisting of amino - phenyl - methyl - sulphone and amino-acetophenone and coupling the same with 1-di-hydroxyethyl-amino-3-acetanilide.

12. Cellulose acetate material colored with a dyestuff prepared by diazotizing a compound selected from the group consisting of amino-phenyl-methyl-sulphone and amino-acetophenone and coupling the same with 1-di-hydroxyethyl-amino-3-acetanilide.

13. Cellulose acetate material colored with a dyestuff prepared by diazotizing o-amino-phenyl-methyl-sulfone and coupling said diazotized amino compound with 1-di-hydroxyethyl-amino-3-acetanilide.

14. Cellulose acetate material colored with a dyestuff prepared by diazotizing p-amino-acetophenone and coupling said diazotized amino compound with 1-di-hydroxyethyl-amino-3-acetanilide.

GEORGE W. SEYMOUR.
VICTOR S. SALVIN.